US010392028B1

(12) United States Patent
Hashimoto et al.

(10) Patent No.: US 10,392,028 B1
(45) Date of Patent: Aug. 27, 2019

(54) AUTONOMOUS DRIVING SYSTEM

(71) Applicant: TOYOTA JIDOSHA KABUSHIKI KAISHA, Toyota-shi, Aichi-ken (JP)

(72) Inventors: Ryuta Hashimoto, Susono (JP); Akira Ito, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/220,090

(22) Filed: Dec. 14, 2018

(30) Foreign Application Priority Data

Feb. 13, 2018 (JP) ................................ 2018-023379

(51) Int. Cl.
*B60W 10/02* (2006.01)
*B60W 50/14* (2012.01)
(Continued)

(52) U.S. Cl.
CPC ............ *B60W 50/14* (2013.01); *B60W 10/02* (2013.01); *G05D 1/0061* (2013.01);
(Continued)

(58) Field of Classification Search
CPC ...... B60W 10/02; B60W 10/04; B60W 10/06; B60W 10/08; B60W 2540/10;
(Continued)

(56) References Cited

U.S. PATENT DOCUMENTS 4,074,117 A * 2/1978 DeLorean .............. G04C 23/50 340/323 R
6,799,106 B2 * 9/2004 Fukushima ......... B60R 16/0231 340/10.1

(Continued)

FOREIGN PATENT DOCUMENTS

JP 2003-308999 * 9/2003 ............. B60R 16/02
JP 2016-071514 A 5/2016
WO 2015/174315 * 11/2015 ........... B60W 30/17

OTHER PUBLICATIONS

The role of humans in self-driving cars is even more complicated after . . . , from https://www.popsci.com/human-drivers-and-self-driving-cars; published Mar. 23, 2018.*

(Continued)

*Primary Examiner* — Cuong H Nguyen
(74) *Attorney, Agent, or Firm* — Sughrue Mion, PLLC

(57) ABSTRACT

An autonomous driving system issues a notification to a driver of a vehicle during autonomous driving. The notification is a proposal or a previous notice of a vehicle action, or a request for manual driving. A notification timing is a timing to issue the notification to the driver. Necessary vehicle control required in connection with the notification includes acceleration/deceleration control and steering control. A start timing limit is a slowest timing to start the necessary vehicle control with which acceleration/deceleration and a steering speed during the necessary vehicle control can be respectively suppressed to predetermined values or lower. In a situation where the start timing limit is earlier than the notification timing, the autonomous driving system starts preliminary control, which is at least a part of the necessary vehicle control, at or before the start timing limit.

4 Claims, 14 Drawing Sheets

(51) Int. Cl.
*G05D 1/00* (2006.01)
*B60W 10/08* (2006.01)

(52) U.S. Cl.
CPC ........... *G05D 1/0088* (2013.01); *B60W 10/08* (2013.01); *B60W 2050/143* (2013.01); *G05D 2201/0213* (2013.01)

(58) Field of Classification Search
CPC ........ F02D 41/064; F02D 41/10; F02D 41/08; F02D 41/12; F02D 41/107; F01N 2430/08; F02P 5/005; F02P 5/05
USPC ................................................ 701/23, 70, 93
See application file for complete search history.

(56) References Cited

U.S. PATENT DOCUMENTS

| | | | | |
|---|---|---|---|---|
| 7,899,589 | B2 * | 3/2011 | Yamada | G01C 21/26 701/25 |
| 8,489,286 | B2 * | 7/2013 | Kobayashi | B60T 7/22 340/435 |
| 8,618,922 | B2 * | 12/2013 | Debouk | B60W 50/038 340/439 |
| 9,051,891 | B2 * | 6/2015 | Watanabe | F02D 41/022 |
| 10,134,287 | B2 * | 11/2018 | Niino | B60W 30/17 |
| 10,156,219 | B1 * | 12/2018 | Lucido | F02D 41/064 |
| 10,214,215 | B2 * | 2/2019 | Nakatsuka | B60W 30/18109 |
| 10,220,842 | B2 * | 3/2019 | Moritani | B60T 7/22 |
| 2006/0293825 | A1 * | 12/2006 | Sporl | B60W 10/06 701/93 |
| 2018/0127001 | A1 * | 5/2018 | Ricci | B60R 25/2018 |
| 2019/0011918 | A1 * | 1/2019 | Son | B60W 50/14 |

OTHER PUBLICATIONS

Self-driving cars take the wheel—MIT Technology Review; from https://www.technologyreview.com/s/612754/self-driving-cars-take-the-wheel/; published Feb. 15, 2019.*

People must retain control of autonomous vehicles—Nature; published on https://www.nature.com > comment Apr. 6, 2018.*

What is self-driving car (autonomous car or driverless car)?—published on https://searchenterpriseai.techtarget.com/definition/driverless-car; May 17, 2018—A self-driving car (sometimes called an autonomous car or . . . to re-take control and is still required to . . . .*

* cited by examiner

AUTONOMOUS DRIVING SYSTEM

BACKGROUND

Technical Field

The present disclosure relates to an autonomous driving system that controls autonomous driving of a vehicle. In particular, the present disclosure relates to an autonomous driving system that issues a notification to a driver during autonomous driving.

Background Art

Patent Literature 1 discloses a driving assist control device mounted on a vehicle. When determining that a lane change is possible, the driving assist control device proposes the lane change to a driver. When the proposed lane change is approved by the driver, the driving assist control device starts acceleration/deceleration control and steering control necessary for the lane change.

List of Related Art

Patent Literature 1: Japanese Unexamined Patent Application Publication No. JP-2016-71514

SUMMARY

According to the technique disclosed in the above-mentioned Patent Literature 1, the driving assist control device proposes a lane change to the driver and, after the proposed lane change is approved by the driver, starts vehicle control (i.e. acceleration/deceleration control and steering control) required for the lane change. Therefore, if the proposal to the driver or the approval by the driver is delayed, rapid acceleration/deceleration or steering is required for completing the lane change at or before a target position.

To generalize, let us consider an autonomous driving system that issues a "notification" to a driver during autonomous driving. The notification is exemplified by a proposal or a previous notice of a vehicle action, or a request for manual driving. Depending on a timing of the notification, there is a possibility that vehicle control (e.g. acceleration/deceleration control, steering control) required in connection with the notification becomes too rapid. Such the rapid acceleration/deceleration or steering causes the driver's sense of anxiety and brings trouble to a surrounding vehicle. These cause decrease in confidence in the autonomous driving system.

An object of the present disclosure is to provide a technique that can smoothly perform vehicle control required in connection with a notification in an autonomous driving system that issues the notification to a driver during autonomous driving.

A first disclosure is directed to an autonomous driving system mounted on a vehicle.

The autonomous driving system includes a control device configured to control autonomous driving of the vehicle and to issue a notification to a driver of the vehicle during the autonomous driving.

The notification is a proposal or a previous notice of a vehicle action, or a request for manual driving.

Necessary vehicle control required in connection with the vehicle action includes acceleration/deceleration control and steering control.

Necessary vehicle control required in connection with the manual driving includes deceleration control that decreases a vehicle speed to a target speed or lower before arriving at a predetermined position.

A notification timing is a timing when the control device issues the notification to the driver.

A start timing limit is a slowest timing to start the necessary vehicle control with which acceleration/deceleration and a steering speed during the necessary vehicle control can be respectively suppressed to predetermined values or lower.

In a situation where the start timing limit is earlier than the notification timing, the control device starts preliminary control, which is at least a part of the necessary vehicle control, at or before the start timing limit.

A second disclosure further has the following feature in addition to the first disclosure.

In the situation where the start timing limit is earlier than the notification timing, the control device starts the preliminary control before the start timing limit, and sets the acceleration/deceleration and the the steering speed during the preliminary control to be lower than the predetermined values, respectively.

A third disclosure further has the following feature in addition to the first disclosure.

A response operation by the driver is approval of the proposed vehicle action or a manual driving operation by the driver.

In another situation where the start timing limit is later than the notification timing and the response operation is not performed by the driver by the start timing limit, the control device starts the preliminary control at the start timing limit.

A fourth disclosure further has the following feature in addition to the first or second disclosure.

In another situation where the start timing limit is later than the notification timing, the control device starts the preliminary control between the notification timing and the start timing limit, and sets the acceleration/deceleration and the the steering speed during the preliminary control to be lower than the predetermined values, respectively.

The autonomous driving system according to the present disclosure performs the necessary vehicle control in connection with the notification. Specifically, the autonomous driving system starts the preliminary control, which is at least a part of the necessary vehicle control, at the start timing limit at the latest. It is therefore possible to prevent the acceleration/deceleration and the steering speed during the necessary vehicle control from exceeding the predetermined values. In other words, it is possible to smoothly perform the necessary vehicle control required in connection with the notification. Since the rapid acceleration/deceleration or steering is prevented, the driver is prevented from feeling a sense of anxiety.

EMBODIMENTS

Embodiments of the present disclosure will be described below with reference to the attached drawings.

1. Outline

Figure 1:
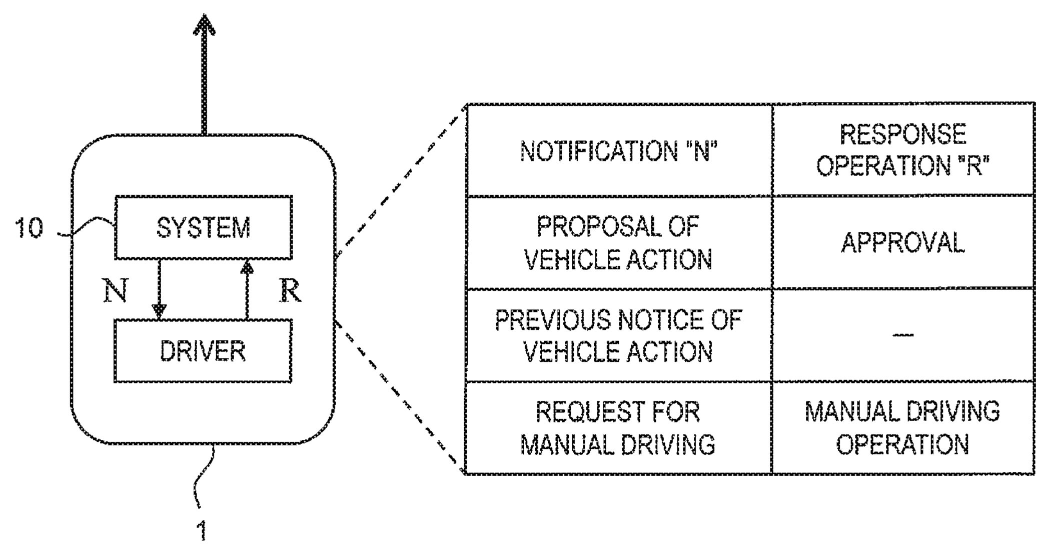
FIG. 1 is a conceptual diagram for explaining an autonomous driving system according to an embodiment of the present disclosure.

FIG. 1 is a conceptual diagram for explaining an autonomous driving system 10 according to the present embodiment. The autonomous driving system 10 is mounted on a vehicle 1 and controls autonomous driving of the vehicle 1. In order to achieve a smooth vehicle travel, the autonomous driving system 10 sometimes issues a "notification N" to a driver of the vehicle 1 during the autonomous driving. The driver performs a "response operation R" in response to the notification N, as appropriate.

An example of the notification N is a proposal of a vehicle action to the driver. For example, the vehicle action is a lane change (LC). Examples of a situation requiring the lane change include lane branching, lane merging, and so forth. When determining that the vehicle action is necessary, the autonomous driving system 10 proposes the vehicle action to the driver. The driver approves or refuses the proposed vehicle action. That is to say, approval or refusal is the response operation R responding to the proposal of the vehicle action. In the following description, we consider only a case where the driver approves. When the proposed vehicle action is approved by the driver, the autonomous driving system 10 performs the vehicle action.

Another example of the notification N is a previous notice of a vehicle action to the driver. In the case of the previous notice of the vehicle action, the driver need not perform any response operation R. The autonomous driving system 10 automatically starts the previously-noticed vehicle action. However, the driver is allowed to cancel the vehicle action.

Still another example of the notification N is a request for manual driving to the driver. Examples of a situation requiring the manual driving are as follows: a zone where the autonomous driving is permitted ends; there is an event (e.g. a tollgate, a roadwork section, complex terrain, etc.) that is hard to handle by the autonomous driving; and so forth. When determining that the manual driving is necessary, the autonomous driving system 10 requests the driver to start the manual driving. In response to the manual driving request, the driver performs a manual driving operation (e.g. steering hold, a steering operation, an acceleration operation, a braking operation). That is to say, the manual driving operation is the response operation R responding to the manual driving request.

Next, let us consider vehicle control (e.g. acceleration/deceleration control, steering control) required in connection with the notification N. The vehicle control required in connection with the notification N is hereinafter referred to as "necessary vehicle control".

Figure 2:
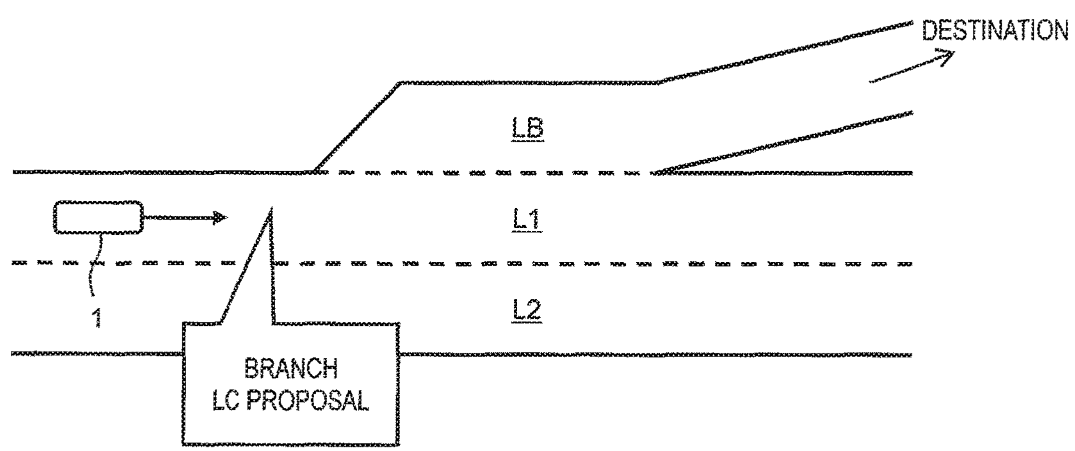
FIG. 2 is a conceptual diagram for explaining an example of a notification in the embodiment of the present disclosure.

As an example of the notification N, FIG. 2 shows a case where a lane change is proposed before lane branching. The vehicle 1 is traveling in a lane L1 of a main line. Ahead of the vehicle 1, a branch lane LB branches off from the lane L1. The autonomous driving system 10 plans to enter the branch lane LB in order to reach a destination. The autonomous driving system 10 proposes to make a lane change from the lane L1 to the branch lane LB.

In general, a speed limit in the branch lane LB is lower than that in the main line. Therefore, when the lane change for the lane branching is planned to be performed, the deceleration control is required. That is, the necessary vehicle control required in connection with the lane change for the lane branching includes the deceleration control and the steering control for moving from the lane L1 to the branch lane LB. If the proposal of the lane change or the approval by the driver is delayed, rapid deceleration and steering may be necessary for the vehicle 1 to enter the branch lane LB.

Figure 3:
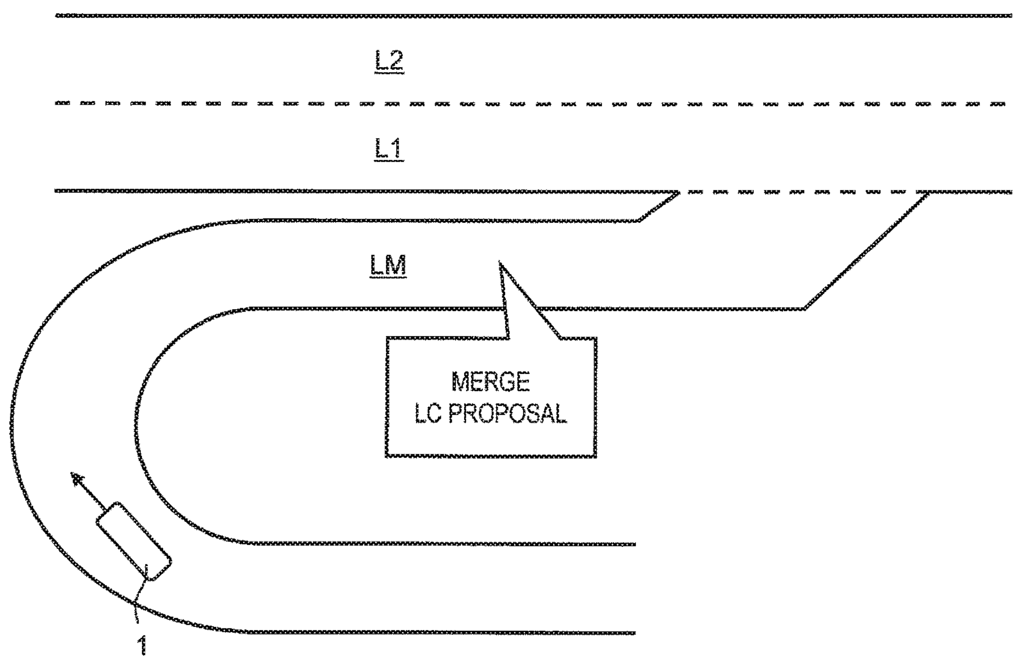
FIG. 3 is a conceptual diagram for explaining another example of the notification in the embodiment of the present disclosure.

As another example of the notification N, FIG. 3 shows a case where a lane change is proposed before lane merging. The vehicle 1 is traveling in a merge lane LM. Ahead of the vehicle 1, the merge lane LM merges with a lane L1 of a main line. The autonomous driving system 10 proposes to make a lane change from the merge lane LM to the lane L1.

In general, a speed limit in the merge lane LM is lower than that in the main line, and a flow in the main line is faster than that in the merge lane LM. Moreover, when there is a curve before a lane merging section as shown in FIG. 3, the vehicle 1 decelerates. Therefore, when the lane change for the lane merging is planned to be performed, the acceleration control is required. That is, the necessary vehicle control required in connection with the lane change for the lane merging includes the acceleration control and the steering control for moving from the merge lane LM to the lane L1. If the proposal of the lane change or the approval by the driver is delayed, rapid acceleration and steering may be necessary for the vehicle 1 to move to the lane L1.

Figure 4:
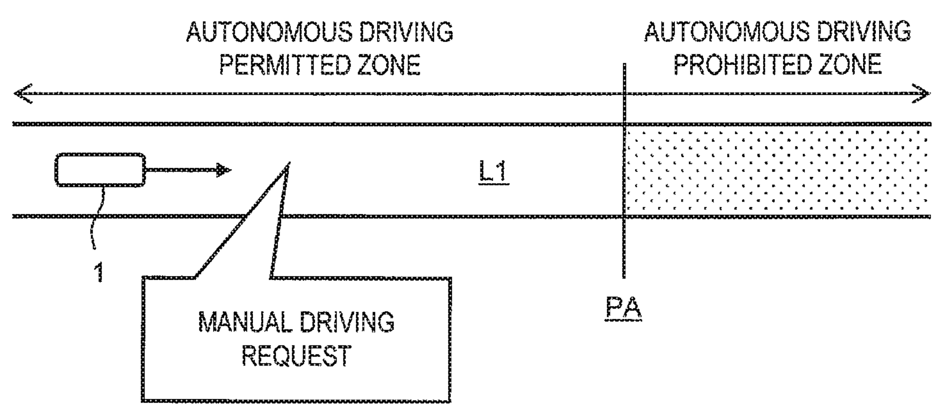
FIG. 4 is a conceptual diagram for explaining still another example of the notification in the embodiment of the present disclosure.

As still another example of the notification N, FIG. 4 shows a case where manual driving is requested. The vehicle 1 is traveling in a lane L1. At a predetermined position PA ahead of the vehicle 1, an autonomous driving permitted zone ends while an autonomous driving prohibited zone starts. The autonomous driving system 10 determines that the manual driving is necessary, and thus requests the driver to start the manual driving before arriving at the predetermined position PA.

In general, the autonomous driving prohibited zone is a zone where the autonomous driving is difficult. It is therefore necessary to sufficiently slow down before arriving at the predetermined position PA. That is, the necessary vehicle control required in connection with the manual driving includes the deceleration control that decreases a vehicle speed to a target speed or lower before arriving at the predetermined position PA. If the manual driving request is delayed or the manual driving operation by the driver is delayed, rapid deceleration may be necessary for setting the vehicle speed at the predetermined position PA to the target speed or lower.

As exemplified above, depending on a timing of the notification N, there is a possibility that the necessary vehicle control (the acceleration/deceleration control, the steering control) required in connection with the notification N becomes too rapid. Such the rapid acceleration/deceleration or steering causes the driver's sense of anxiety and brings trouble to a surrounding vehicle. These cause decrease in confidence in the autonomous driving system 10. In view of the above, the autonomous driving system 10 according to the present embodiment is configured to be capable of smoothly performing the necessary vehicle control required in connection with the notification N.

Figure 5:
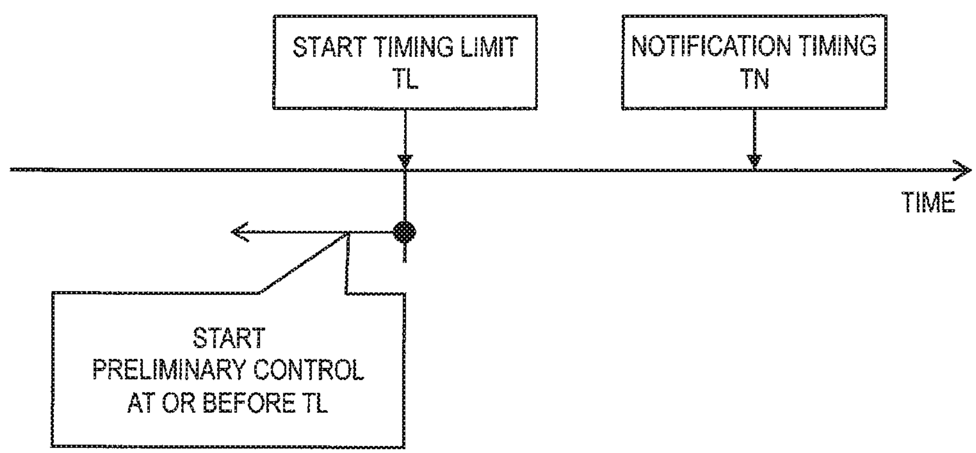
FIG. 5 is a conceptual diagram for explaining an outline of processing by the autonomous driving system according to the embodiment of the present disclosure.

FIG. 5 is a conceptual diagram for explaining an outline of processing by the autonomous driving system 10 according to the present embodiment. A "notification timing TN" is a timing when the autonomous driving system 10 issues the notification N to the driver. If the notification timing TN is too early, the driver cannot understand what the notification N is intended to and thus feels a sense of strangeness about the notification N having no context. It is therefore preferable that the notification timing TN is determined as usual.

A "start timing limit TL" is a slowest (last) timing at which the necessary vehicle control described above should be started. More specifically, the start timing limit TL is the slowest (last) timing to start the necessary vehicle control with which acceleration/deceleration and a steering speed during the necessary vehicle control can be respectively suppressed to "predetermined values" or lower. Here, the predetermined values are upper limit values of the acceleration/deceleration and the steering speed with which reasonable and smooth acceleration/deceleration and steering are realized. If the necessary vehicle control is started after the start timing limit TL, it is forced to execute the necessary vehicle control with the acceleration/deceleration or the steering speed higher than the predetermined value.

According to the present embodiment, in a situation where the start timing limit TL is earlier than the notification timing TN, the autonomous driving system 10 starts at least a part of the necessary vehicle control without waiting for the notification timing TN. More specifically, in the situation where the start timing limit TL is earlier than the notification timing TN, the autonomous driving system 10 starts at least a part of the necessary vehicle control at the start timing limit TL or before the start timing limit TL. The part of the necessary vehicle control performed here is hereinafter referred to as "preliminary control".

For example, in the case of the lane change for the lane branching shown in FIG. 2, the necessary vehicle control includes the deceleration control and the steering control for moving from the lane L1 to the branch lane LB. In this case, the preliminary control includes the deceleration control which is a part of the necessary vehicle control. The preliminary control may further include the steering control for beforehand getting close to the side of the branch lane LB within the lane L1. However, the preliminary control does not include the steering control for crossing a lane boundary to move into the branch lane LB. The steering control for crossing the lane boundary to move into the branch lane LB is included in "main control" in the necessary vehicle control.

As another example, in the case of the lane change for the lane merging shown in FIG. 3, the necessary vehicle control includes the acceleration control and the steering control for moving from the merge lane LM to the lane L1. In this case, the preliminary control includes the acceleration control which is a part of the necessary vehicle control. The preliminary control may further include the steering control for beforehand getting close to the side of the lane L1 within the merge lane LM. However, the preliminary control does not include the steering control for crossing the lane boundary to move into the lane L1. The steering control for crossing the lane boundary to move into the lane L1 is included in "main control" in the necessary vehicle control.

As still another example, in the case of the manual driving request shown in FIG. 4, the necessary vehicle control includes the deceleration control that decreases the vehicle speed to the target speed or lower before arriving at the predetermined position PA. In this case, the preliminary control includes at least a part of the deceleration control. That is, the autonomous driving system 10 also performs the deceleration control in addition to the deceleration control by the driver.

Figure 6:
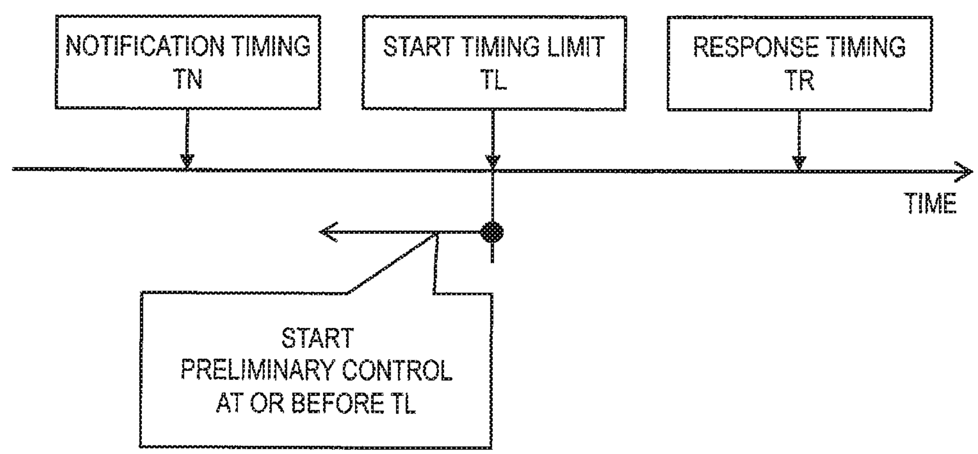
FIG. 6 is a conceptual diagram for explaining an outline of processing by the autonomous driving system according to the embodiment of the present disclosure.

FIG. 6 shows another situation where the notification timing TN is earlier than the start timing limit TL. The driver does not always perform the response operation R (i.e. approval or manual driving operation) immediately after the notification N is issued to the driver. For example, when the driver's awareness is low, the driver cannot promptly perform the response operation R in response to the notification N. Therefore, the start timing limit TL may come after the notification timing TN and before a response timing TR when the response operation R is performed. In this case, it is preferable to start the preliminary control without waiting for the response operation R by the driver.

As shown in FIG. 6, in the situation where the start timing limit TL is later than the notification timing TN and the response operation R is not performed by the start timing limit TL, the autonomous driving system 10 starts the preliminary control at the start timing limit TL. Alternatively, the autonomous driving system 10 can start the preliminary control before the start timing limit TL, that is, between the notification timing TN and the start timing limit TL.

As described above, the autonomous driving system 10 according to the present embodiment performs the necessary vehicle control in connection with the notification N. Specifically, the autonomous driving system 10 starts the preliminary control, which is at least a part of the necessary vehicle control, at the start timing limit TL at the latest. It is therefore possible to prevent the acceleration/deceleration and the steering speed during the necessary vehicle control from exceeding the predetermined values. In other words, it is possible to smoothly perform the necessary vehicle control required in connection with the notification N. Since the rapid acceleration/deceleration or steering is prevented, the driver is prevented from feeling a sense of anxiety.

When the preliminary control is started before the start timing limit TL, it is possible to set the acceleration/deceleration and the steering speed during the preliminary control to be lower than the predetermined values, respectively. Setting the acceleration/deceleration and the steering speed during the preliminary control to be lower than the respective predetermined values makes it possible to reduce the driver's feeling of strangeness about the preliminary control. For example, it is possible to perform the preliminary control softly such that the driver cannot notice the preliminary control.

As a comparative example, it may be considered to put the notification timing TN ahead in order to suppress the acceleration/deceleration and the steering speed during the necessary vehicle control. However, if the notification timing TN is too early, the driver cannot understand what the notification N is intended to and thus feels a sense of strangeness about the notification N having no context. According to the present embodiment, the preliminary control is performed instead of putting the notification timing TN ahead. As a result, the driver is prevented from feeling the sense of strangeness about the notification N having no context.

Hereinafter, a configuration of and processing by the autonomous driving system 10 according to the present embodiment will be described in more detail.

2. Configuration Example of Autonomous Driving System

Figure 7:
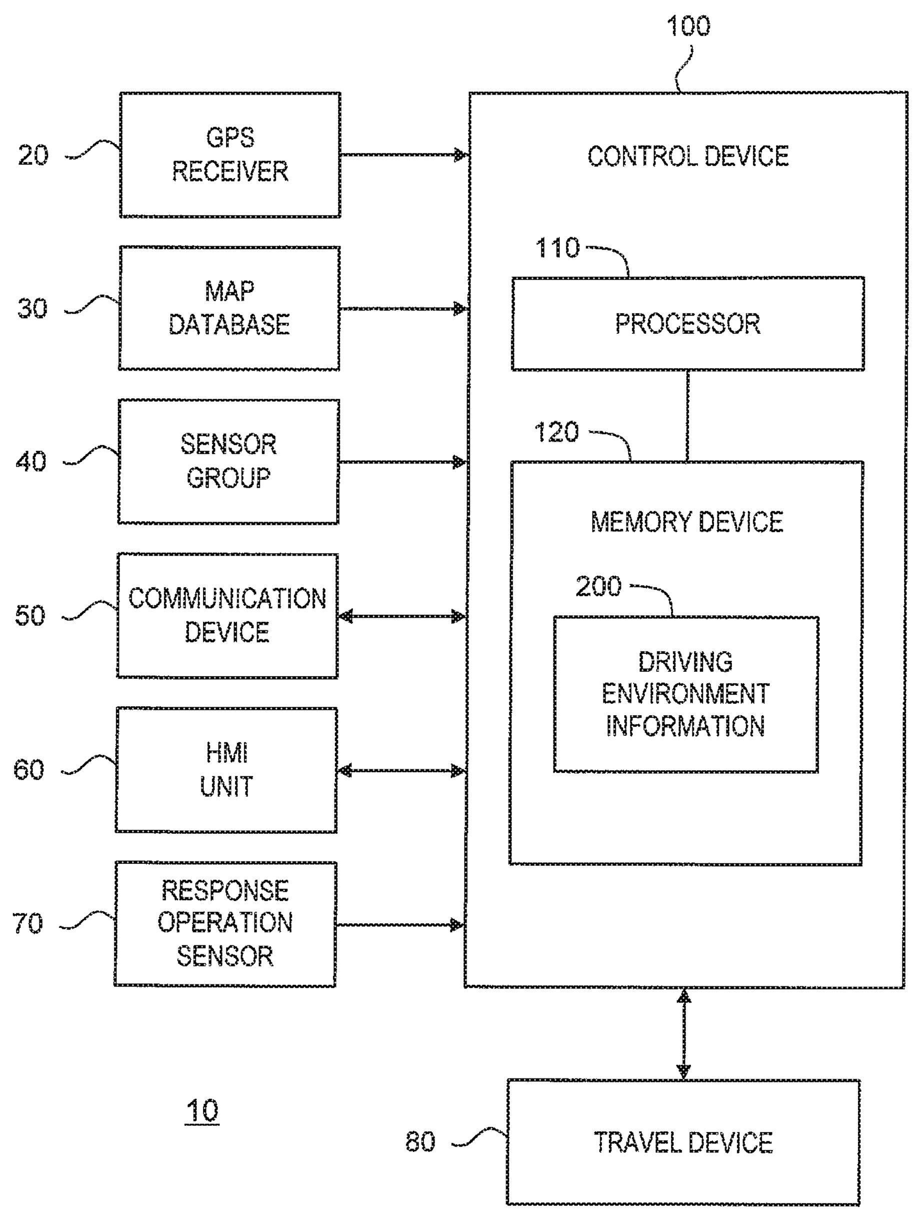
FIG. 7 is a block diagram showing a configuration example of the autonomous driving system according to the embodiment of the present disclosure.

FIG. 7 is a block diagram showing a configuration example of the autonomous driving system 10 according to the present embodiment. The autonomous driving system 10 is provided with a GPS (Global Positioning System) receiver 20, a map database 30, a sensor group 40, a communication device 50, an HMI (Human Machine Interface) unit 60, a response operation sensor 70, a travel device 80, and a control device 100.

The GPS receiver 20 receives signals transmitted from a plurality of GPS satellites and calculates a position and an orientation of the vehicle 1 based on the received signals.

Map information is recorded in the map database 30. The map information includes information of lane geometries, lane attributes, autonomous driving permitted zones, positions of facilities (a tollgate, for example), and the like.

The sensor group 40 detects a situation around the vehicle 1 and a travel state of the vehicle 1. The sensor group 40 is exemplified by a LIDAR (Laser Imaging Detection and Ranging), a radar, a camera, a vehicle speed sensor, and the like. The LIDAR uses laser lights to detect a target around the vehicle 1. The radar uses radio waves to detect a target around the vehicle 1. The camera images a situation around the vehicle 1. The vehicle speed sensor detects a speed of the vehicle 1.

The communication device 50 communicates with the outside of the vehicle 1. For example, the communication device 50 performs a V2I communication (a vehicle-to-infriastructure communication) with a surrounding infrastructure. The communication device 50 may perform a V2V communication (a vehicle-to-vehicle communication) with a surrounding vehicle. In addition, the communication device 50 may communicate with a management server managing autonomous driving service through a communication network.

The HMI unit 60 is an interface for proving the driver with information and receiving information from the driver. More specifically, the HMI unit 60 includes an input device and an output device. The input device is exemplified by a touch panel, a switch, a microphone, and the like. The output device is exemplified by a display device, a speaker, and the like. The output device is used for outputting the notification N to the driver. The input device is used by the driver for inputting the response operation R (especially, approval/refusal).

In some cases, the response operation R by the driver is the manual driving operation (e.g. the steering hold, the steering operation, the acceleration operation, the braking operation). The response operation sensor 70 includes a sensor for detecting the response operation R other than approval and refusal. For example, the response operation sensor 70 includes a steering wheel touch sensor for detecting whether or not the driver is holding the steering wheel. The response operation sensor 70 may include sensors for detecting the steering operation, the acceleration operation, and the braking operation, respectively.

The travel device 80 includes a steering device, a driving device, a braking device, and so forth. The steering device turns wheels. The driving device is a power source that generates a driving force. The driving device is exemplified by an engine and an electric motor. The braking device generates a braking force.

The control device 100 controls the autonomous driving of the vehicle 1. The control device 100 is a microcomputer including a processor 110 and a memory device 120. The control device 100 is also called an ECU (Electronic Control Unit). The autonomous driving control by the control device 100 is achieved by the processor 110 executing a control program stored in the memory device 120.

More specifically, the control device 100 acquires information necessary for the autonomous driving control. The information necessary for the autonomous driving control is hereinafter referred to as "driving environment information 200". The driving environment information 200 is stored in the memory device 120, and read out and used as appropriate.

Figure 8:
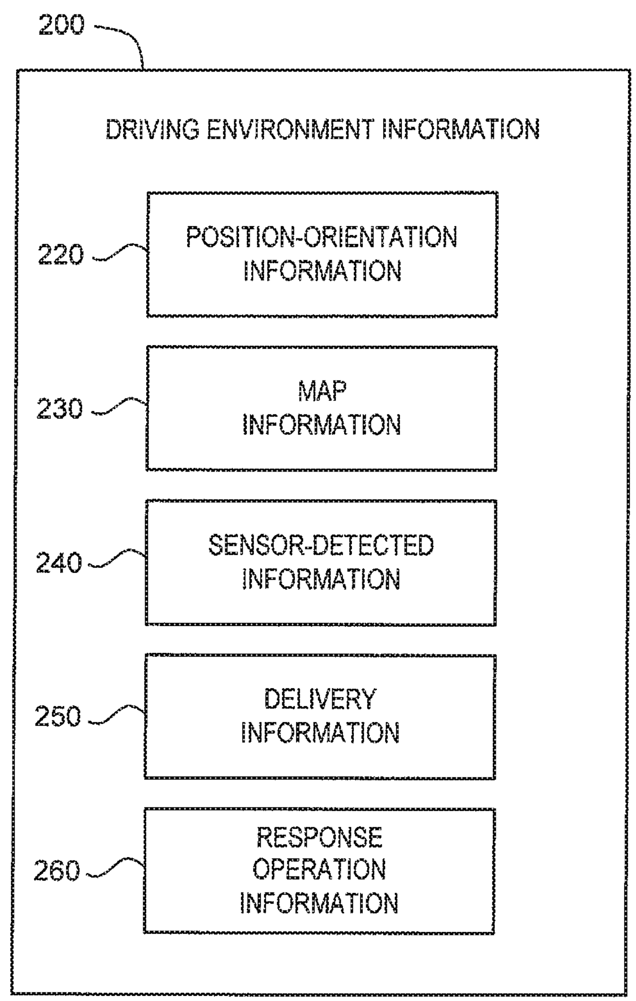
FIG. 8 is a block diagram showing an example of driving environment information used in the autonomous driving system according to the embodiment of the present disclosure.

FIG. 8 shows an example of the driving environment information 200 in the present embodiment. The driving environment information 200 includes position-orientation information 220, map information 230, sensor-detected information 240, delivery information 250, and response operation information 260.

The position-orientation information 220 indicates the position and the orientation of the vehicle 1. The control device 100 acquires the position-orientation information 220 from the GPS receiver 20.

The map information 230 includes information of lane geometries, lane attributes, autonomous driving permitted zones, positions of facilities (a tollgate, for example), and the like. The control device 100 acquires the map information 230 around the vehicle 1 based on the position-orientation information 220 and the map database 30. Based on the lane geometries and the lane attributes indicated by the map information 230, the control device 100 can recognize lane merging, lane branching, intersections, lane curvatures, and so forth.

The sensor-detected information 240 is information acquired based on a result of detection by the sensor group 40. More specifically, the sensor-detected information 240 includes target information regarding a target around the vehicle 1. The target around the vehicle 1 is exemplified by a surrounding vehicle, a pedestrian, a roadside structure, a white line, a sign, and so forth. In addition, the sensor-detected information 240 includes the vehicle speed detected by the vehicle speed sensor. The control device 100 acquires the sensor-detected information 240 based on the result of detection by the sensor group 40.

The delivery information 250 is information acquired through the communication device 50. For example, the delivery information 250 includes road traffic information (traffic jam information, roadwork section information, accident information, traffic regulation information, and the like) delivered from the infrastructure. The delivery information 250 may include information delivered from the management server managing the autonomous driving service. The control device 100 acquires the delivery information 250 by using the communication device 50 to communicate with the outside of the vehicle 1.

The response operation information 260 is information indicating whether or not the response operation R is performed by the driver. For example, the control device 100 acquires the response operation information 260 regarding approval and refusal through the HMI unit 60. In addition, the control device 100 acquires the response operation information 260 regarding the response operation R other than approval and refusal from the response operation sensor 70.

It can be said that the control device 100, the GPS receiver 20, the map database 30, the sensor group 40, the communication device 50, the HMI unit 60, and the response operation sensor 70 constitute an "information acquisition device" that acquires the driving environment information 200.

The control device 100 controls the autonomous driving of the vehicle 1 based on the driving environment information 200 thus acquired. More specifically, the control device 100 creates a travel plan of the vehicle 1 based on the driving environment information 200. Then, the control device 100 controls the travel device 80 to make the vehicle 1 travel in accordance with the travel plan. It can be said that the control device 100 and the travel device 80 constitute an "autonomous driving control device" that controls the autonomous driving based on the driving environment information 200.

Furthermore, the control device 100 (the autonomous driving control device) plans the notification N to the driver during the autonomous driving, as appropriate. Then, the control device 100 uses the HMI unit 60 to issue the notification N to the driver. The driver performs the response operation R in response to the notification N, as appropriate. The control device 100 determines, based on the response operation information 260, that the response operation R is performed by the driver. For example, when the notification N is a proposal of a lane change and the proposal is approved by the driver, the control device 100 controls the travel device 80 to execute the lane change.

3. Process Flow

3-1. First Example

Figure 9:
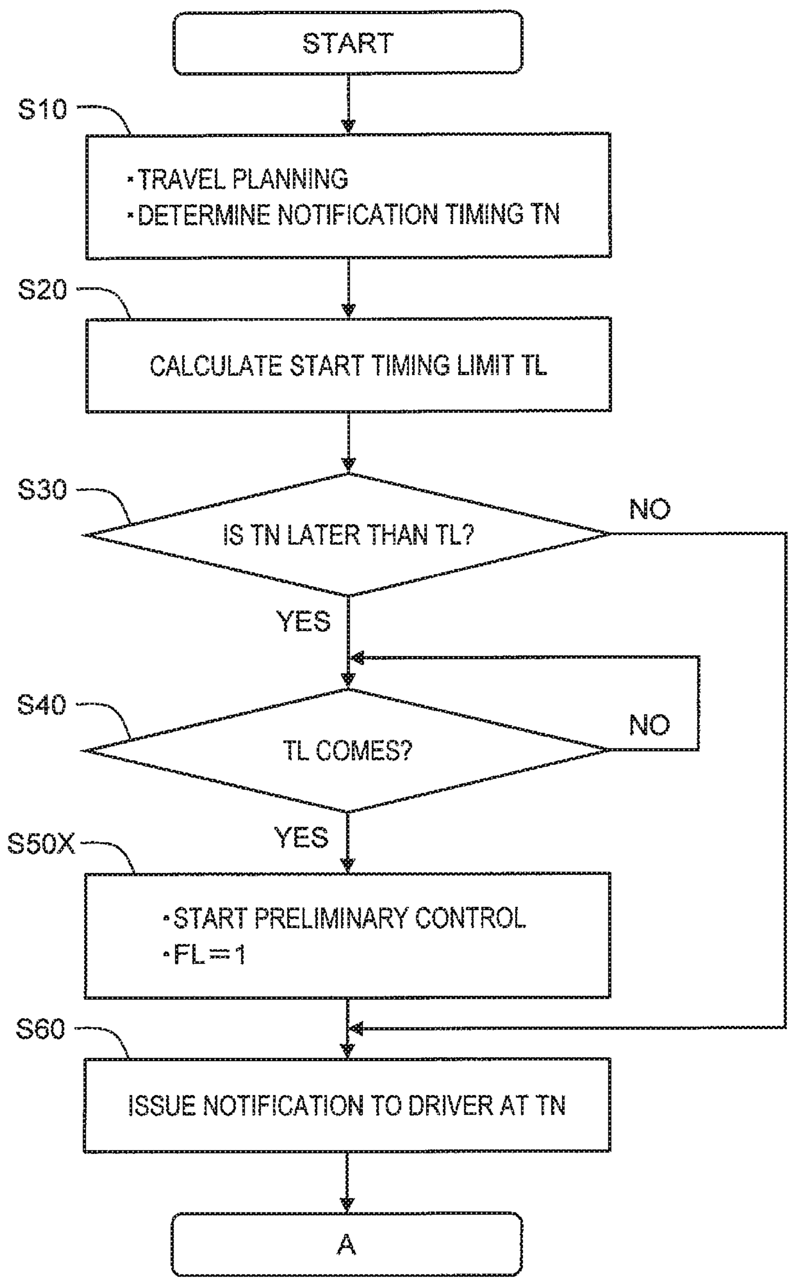
FIG. 9 is a flow chart showing a first example of processing by the autonomous driving system according to the embodiment of the present disclosure.
Figure 10:
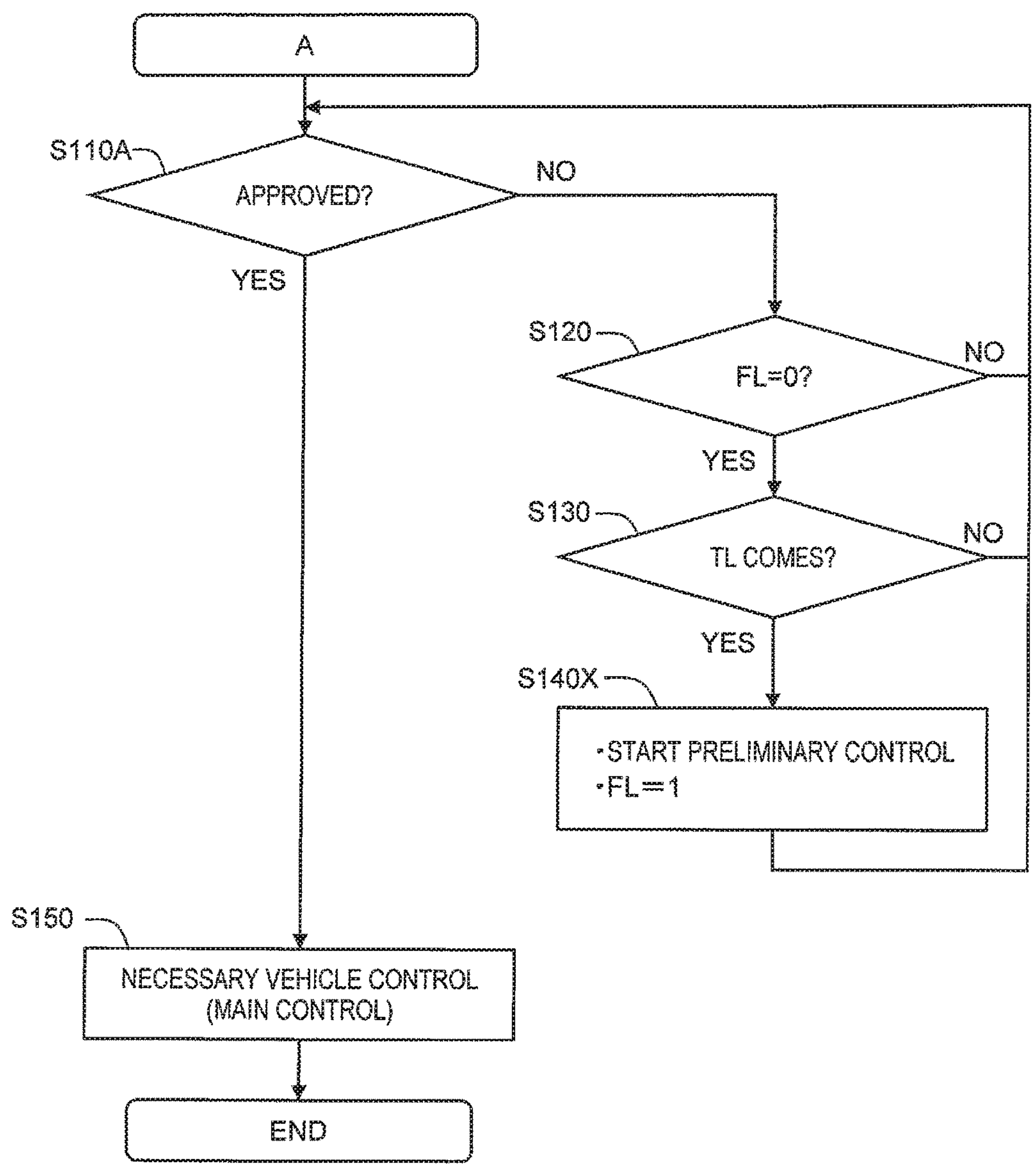
FIG. 10 is a flow chart showing the first example of processing by the autonomous driving system according to the embodiment of the present disclosure.
Figure 11:
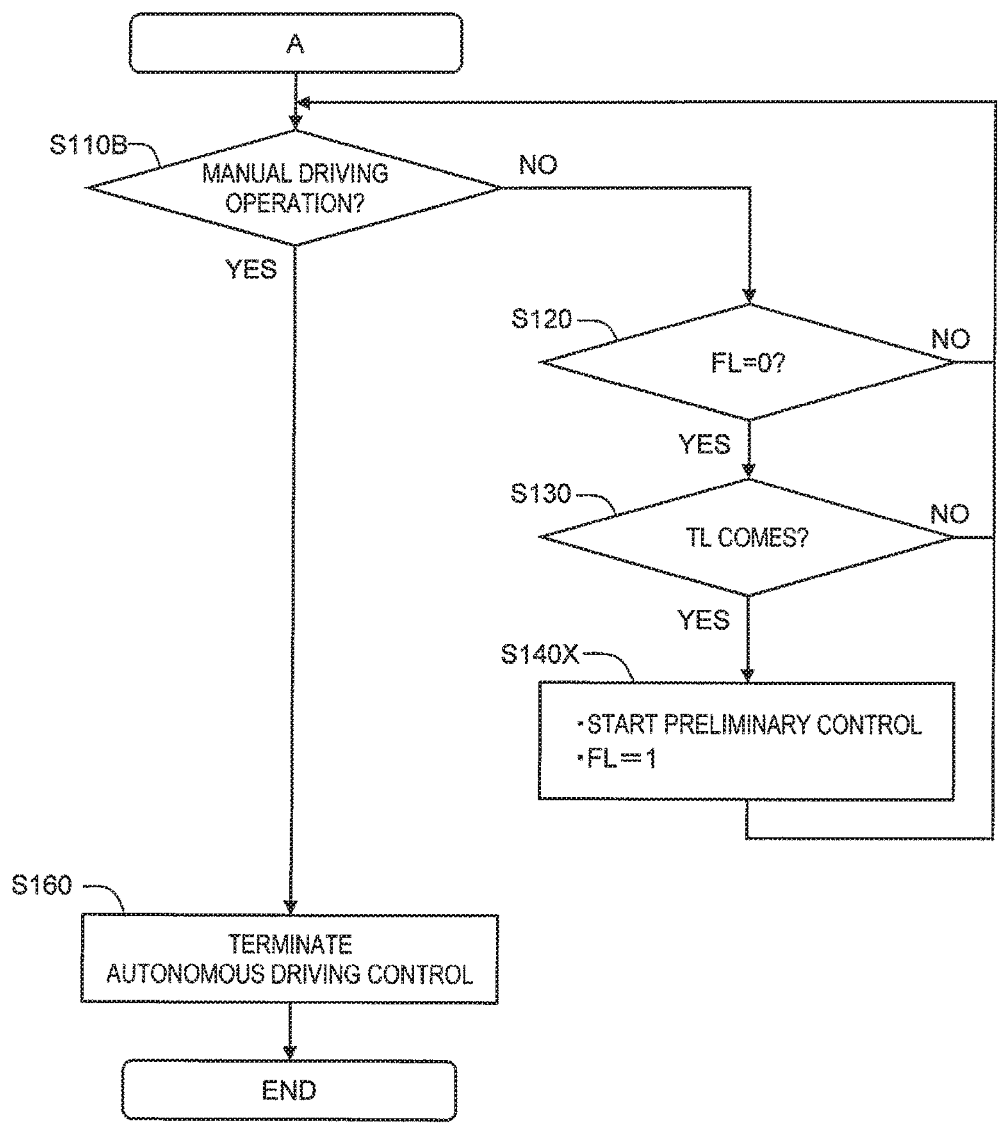
FIG. 11 is a flow chart showing the first example of processing by the autonomous driving system according to the embodiment of the present disclosure.

FIGS. 9 to 11 are flow charts showing a first example of processing by the control device 100 (the autonomous driving control device) according to the present embodiment. First, a process flow up to the issuance of the notification N to the driver will be described with reference to FIG. 9.

Step S10:

The control device 100 generates a travel plan of the vehicle 1 based on the driving environment information 200. The control device 100 plans to issue the notification N to the driver, as appropriate.

For example, the control device 100 determines that the lane change is necessary for the lane branching (see FIG. 2) or the lane merging (see FIG. 3). The lane branching and the lane merging can be recognized based on the map information 230. When determining that the lane change is necessary, the control device 100 plans to propose or previously notice the lane change.

As another example, the control device 100 plans to issue the manual driving request. Events relating to the manual driving request include a destination, a tollgate, an end point of the autonomous driving permitted zone, and so forth. Such the events can be recognized based on the map information 230. The events relating to the manual driving request further include an event that is hard to handle by the autonomous driving, such as a roadwork section, a congestion section, complex terrain, and so forth. The roadwork section and the congestion section can be recognized based on the delivery information 250. The complex terrain can be recognized based on the map information 230.

The control device 100 determines the notification timing TN to issue the notification N. Various examples can be considered as a method of determining the notification timing TN. According to the present embodiment, the method of determining the notification timing TN is not limited in particular. However, if the notification timing TN is too early, the driver cannot understand what the notification N is intended to and thus feels a sense of strangeness about the notification N having no context. It is therefore preferable to set the notification timing TN to a timing that does not bring a sense of strangeness to the driver.

Step S20:

Subsequently, the control device 100 calculates the start timing limit TL. For example, the control device 100 can calculate the acceleration/deceleration and the steering speed required for achieving a target speed at a target position, based on the vehicle position, the vehicle speed, and the target speed at the target position. The start timing limit TL is the slowest (last) timing to start the necessary vehicle control with which the required acceleration/deceleration and steering speed can be respectively suppressed to the predetermined values or lower.

Step S30:

The control device 100 makes a comparison between the notification timing TN and the start timing limit TL. When the notification timing TN is later than the start timing limit TL (Step S30; Yes), the process proceeds to Step S40. On the other hand, when the notification timing TN is earlier than the start timing limit TL (Step S30; No), the process proceeds to Step S60.

Step S40:

The control device 100 determines whether or not the start timing limit TL has come. When the start timing limit TL comes (Step S40; Yes), the process proceeds to Step S50X.

Step S50X:

The control device 100 starts the preliminary control. In addition, the control device 100 sets a preliminary control execution flag FL to "1". The preliminary control execution flag FL is a flag indicating that the preliminary control is in execution, and its initial value is "0". It should be noted that when starting the preliminary control, the control device 100 may notify the driver of "the start of the preliminary control" through the HMI unit 60. As a result, the driver's feeling of strangeness about the preliminary control can be reduced. After Step S50X, the process proceeds to Step S60.

Step S60:

At the notification timing TN, the control device 100 issues the notification N to the driver through the HMI unit 60.

FIG. 10 shows a process flow after the issuance of the notification N to the driver. In particular, FIG. 10 shows a situation where the notification N is "the proposal of the vehicle action".

Step S110A:

The control device 100 determines, based on the response operation information 260, whether or not the proposed vehicle action is approved by the driver. When the vehicle action is approved (Step S110A; Yes), the process proceeds to Step S150. On the other hand, when the vehicle action is not yet approved (Step S110A; No), the process proceeds to Step S120.

Step S120:

When the preliminary control execution flag FL is "1" (Step S120; No), the preliminary control is already started. In this case, the process returns back to Step S110A. When the preliminary control execution flag FL is "0" (Step S120; Yes), the process proceeds to Step S130.

Step S130:

The control device 100 determines whether or not the start timing limit TL has come. When the start timing limit TL comes (Step S130; Yes), the process proceeds to Step S140X. On the other hand, when the start timing limit TL has not yet come (Step S130; No), the process returns back to Step S110A.

Step S140X:

The control device 100 starts the preliminary control. In addition, the control device 100 sets the preliminary control execution flag FL to "1". After that, the process returns back to Step S110A.

Step S150:

When the proposed vehicle action is approved by the driver, the control device 100 executes the necessary vehicle control (the main control) required for the vehicle action.

FIG. 11 shows a process flow after the issuance of the notification N to the driver, as in the case of FIG. 10. In particular, FIG. 11 shows a situation where the notification N is "the request for the manual driving". Overlapping descriptions with the case of FIG. 10 will be omitted as appropriate.

Step S110B:

The control device 100 determines, based on the response operation information 260, whether or not the manual driving operation is performed by the driver. When the manual driving operation is performed (Step S110B; Yes), the process proceeds to Step S160. On the other hand, when the manual driving operation is not yet performed (Step S110B; No), the process proceeds to Step S120. Steps S120 to S140X are the same as in the case of FIG. 10.

Step S160:

The control device 100 terminates the autonomous driving control. The driver performs the manual driving.

3-2. Second Example

Figure 12:
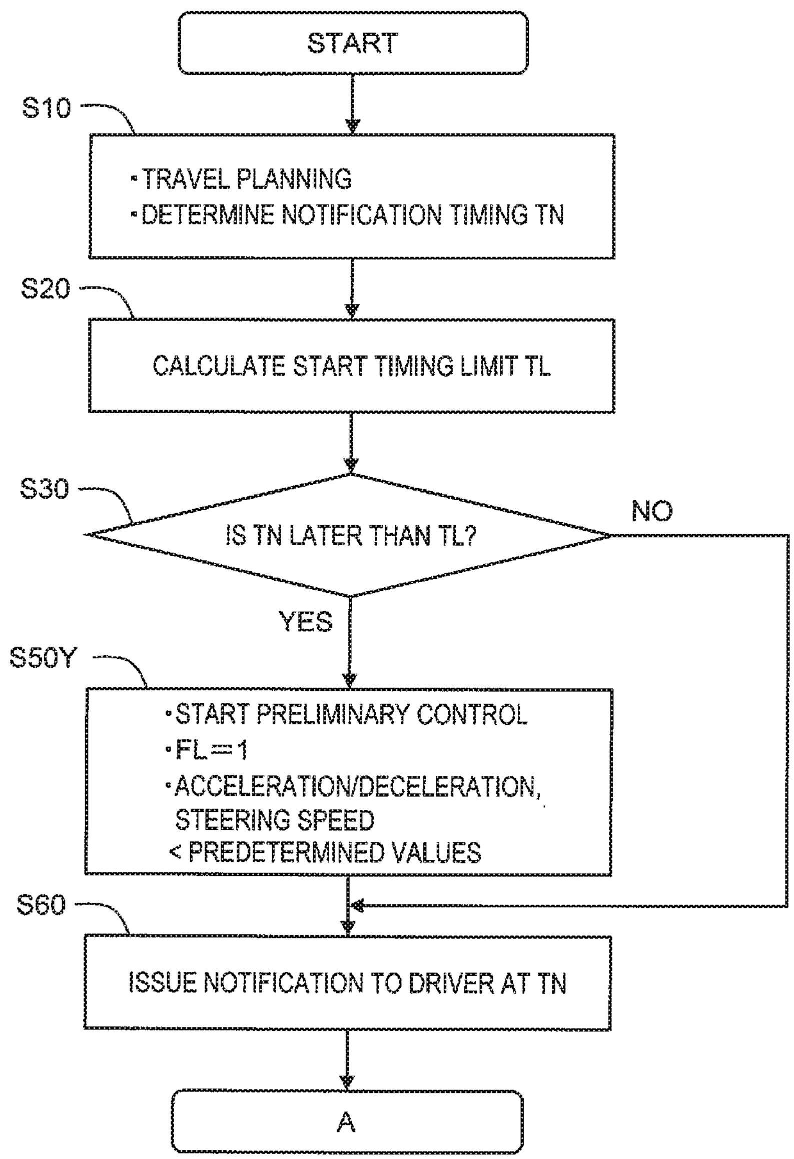
FIG. 12 is a flow chart showing a second example of processing by the autonomous driving system according to the embodiment of the present disclosure.
Figure 13:
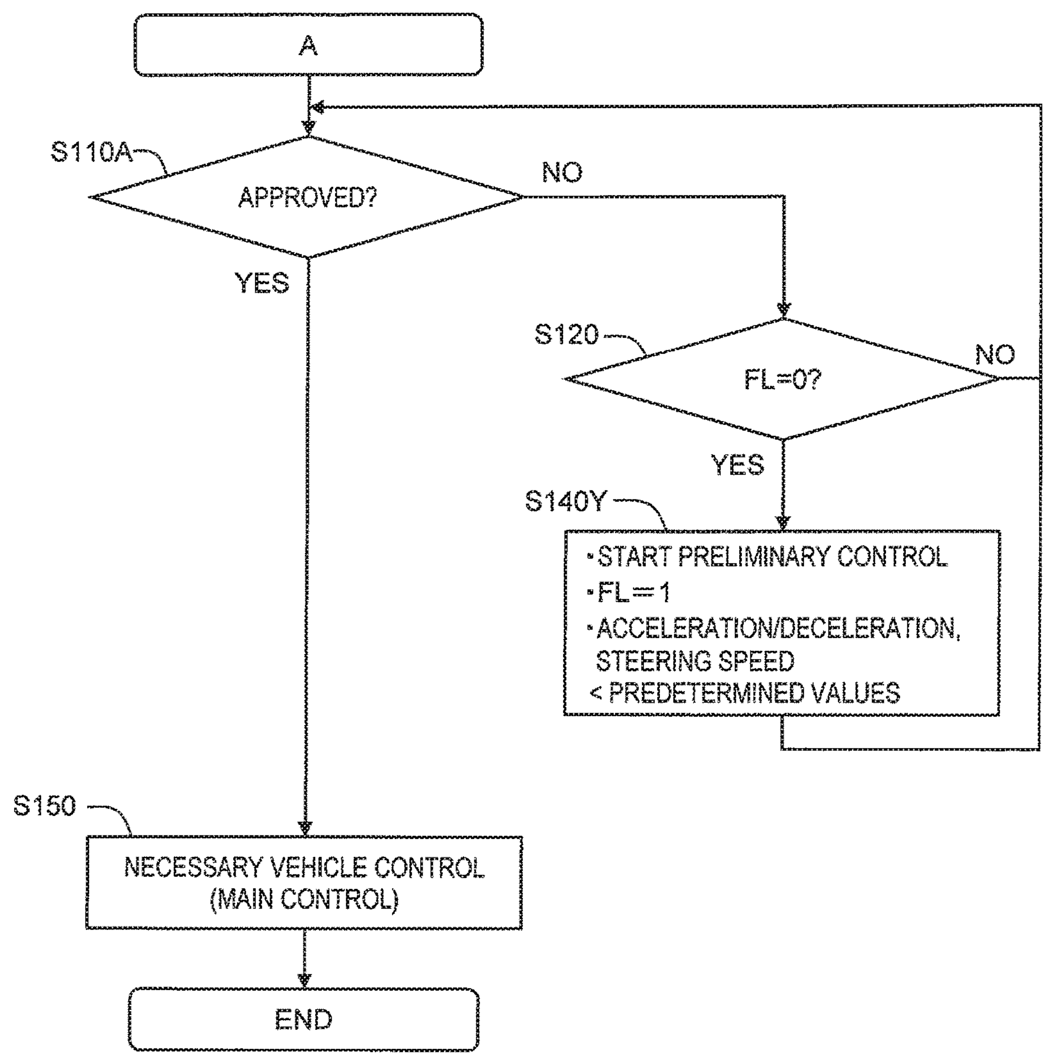
FIG. 13 is a flow chart showing the second example of processing by the autonomous driving system according to the embodiment of the present disclosure.
Figure 14:
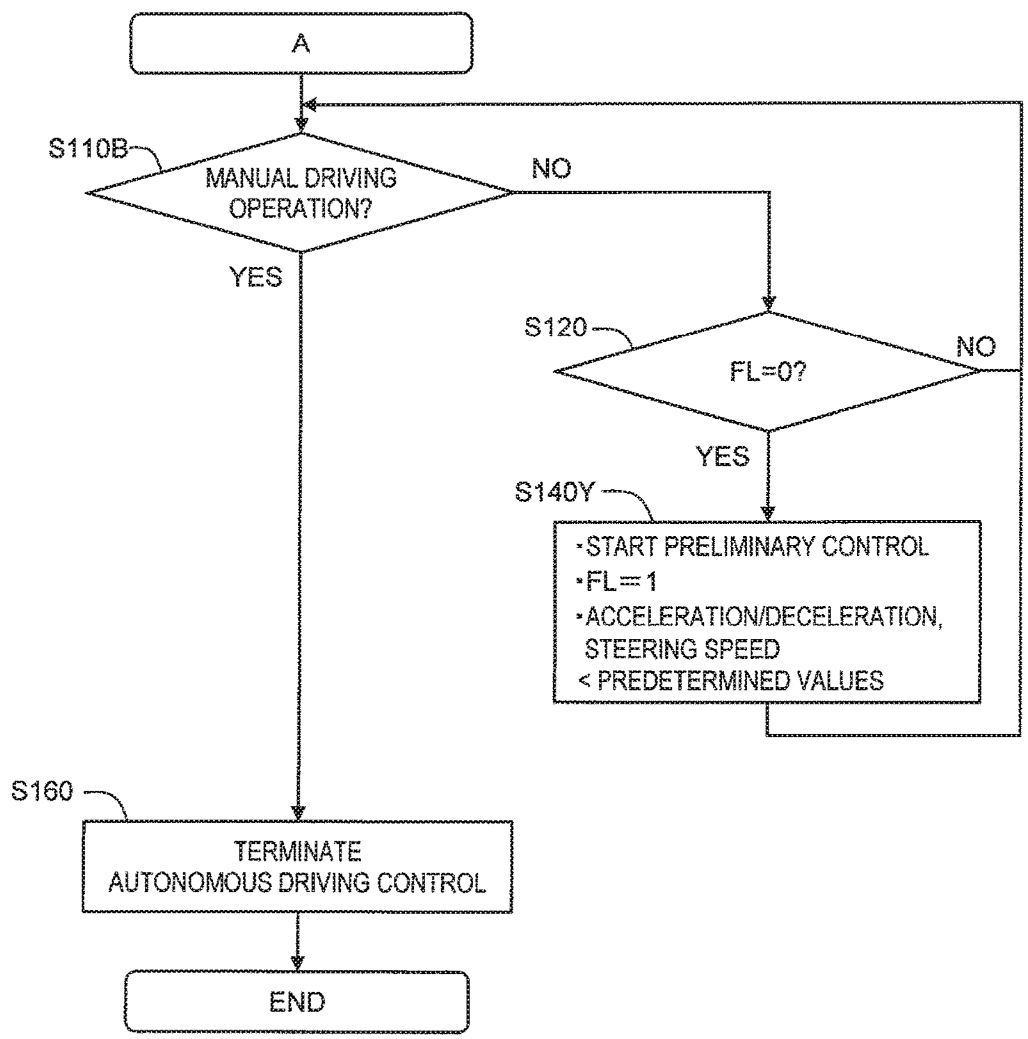
FIG. 14 is a flow chart showing the second example of processing by the autonomous driving system according to the embodiment of the present disclosure.

FIGS. 12 to 14 are flow charts showing a second example of processing by the control device 100 (the autonomous driving control device) according to the present embodiment. Overlapping descriptions with the first example will be omitted as appropriate.

FIG. 12 shows a process flow up to the issuance of the notification N to the driver, as in the case of FIG. 9. As compared with the case of FIG. 9, Step S40 is omitted and Step S50X is replaced with Step S50Y. In Step S50Y, the control device 100 starts the preliminary control without waiting for the start timing limit TL. That is, the control device 100 starts the preliminary control before the start timing limit TL. Moreover, the control device 100 sets the acceleration/deceleration and the steering speed during the preliminary control to be lower than the predetermined values, respectively.

FIG. 13 shows a process flow after the issuance of the notification N to the driver, as in the case of FIG. 10. As compared with the case of FIG. 10, Step S130 is omitted and Step S140X is replaced with Step S140Y. In Step S140Y, the control device 100 starts the preliminary control without waiting for the start timing limit TL. That is, the control device 100 starts the preliminary control before the start timing limit TL. Moreover, the control device 100 sets the acceleration/deceleration and the steering speed during the preliminary control to be lower than the predetermined values, respectively.

FIG. 14 shows a process flow after the issuance of the notification N to the driver, as in the case of FIG. 11. As compared with the case of FIG. 11, Step S130 is omitted and Step S140X is replaced with Step S140Y. Step S140Y is the same as in the case of FIG. 13.

According to the second example described above, the control device 100 starts the preliminary control before the start timing limit TL. In this case, it is possible to set the acceleration/deceleration and the steering speed during the preliminary control to be lower than the predetermined values, respectively. Setting the acceleration/deceleration and the steering speed during the preliminary control to be lower than the respective predetermined values makes it possible to reduce the driver's feeling of strangeness about the preliminary control. For example, it is possible to perform the preliminary control softly such that the driver cannot notice the preliminary control.

What is claimed is:

1. An autonomous driving system mounted on a vehicle and comprising a control device configured to control autonomous driving of the vehicle and to issue a notification to a driver of the vehicle during the autonomous driving, wherein:

the notification is a proposal or a previous notice of a vehicle action, or a request for manual driving;

necessary vehicle control required in connection with the vehicle action includes acceleration/deceleration control and steering control;

necessary vehicle control required in connection with the manual driving includes deceleration control that decreases a vehicle speed to a target speed or lower before arriving at a predetermined position;

a notification timing is a timing when the control device issues the notification to the driver;

a start timing limit is a slowest timing to start the necessary vehicle control with which acceleration/deceleration and a steering speed during the necessary vehicle control can be respectively suppressed to predetermined values or lower, and in a situation where the start timing limit is earlier than the notification timing, the control device starts preliminary control, which is at least a part of the necessary vehicle control, at or before the start timing limit.

2. The autonomous driving system according to claim 1, wherein in the situation where the start timing limit is earlier than the notification timing, the control device starts the preliminary control before the start timing limit, and sets the acceleration/deceleration and the the steering speed during the preliminary control to be lower than the predetermined values, respectively.

3. The autonomous driving system according to claim 1, wherein:

a response operation by the driver is approval of the proposed vehicle action or a manual driving operation by the driver; and in another situation where the start timing limit is later than the notification timing and the response operation is not performed by the driver by the start timing limit, the control device starts the preliminary control at the start timing limit.

4. The autonomous driving system according to claim 1, wherein in another situation where the start timing limit is later than the notification timing, the control device starts the preliminary control between the notification timing and the start timing limit, and sets the acceleration/deceleration and the the steering speed during the preliminary control to be lower than the predetermined values, respectively.

* * * * *